United States Patent
Lu

(10) Patent No.: US 11,405,794 B2
(45) Date of Patent: Aug. 2, 2022

(54) DOWNSTREAM MODEM CHANNEL ANALYSIS AND ALLOCATION SYSTEM AND METHOD

(71) Applicant: ARRIS Enterprises LLC, Suwannee, GA (US)

(72) Inventor: Echo Lu, Hickory, NC (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 72 days.

(21) Appl. No.: 17/109,590

(22) Filed: Dec. 2, 2020

(65) Prior Publication Data

US 2021/0204139 A1 Jul. 1, 2021

Related U.S. Application Data

(63) Continuation of application No. PCT/CN2019/130358, filed on Dec. 31, 2019.

(51) Int. Cl.
| | |
|---|---|
| H04W 16/14 | (2009.01) |
| H04W 48/18 | (2009.01) |
| H04L 5/02 | (2006.01) |
| H04N 21/61 | (2011.01) |
| H04L 12/28 | (2006.01) |

(52) U.S. Cl.
CPC ............ *H04W 16/14* (2013.01); *H04L 5/023* (2013.01); *H04L 12/2801* (2013.01); *H04N 21/6118* (2013.01); *H04W 48/18* (2013.01)

(58) Field of Classification Search
CPC ...... H04W 16/14; H04W 48/18; H04L 5/023; H04L 12/2801; H04L 12/2878; H04N 21/2385; H04N 21/6118; H04N 21/2143; H04N 21/615; H04N 21/64738
See application file for complete search history.

(56) References Cited

U.S. PATENT DOCUMENTS 4,905,301 A 2/1990 Krolopp et al.

FOREIGN PATENT DOCUMENTS

| CN | 1104024 A | 6/1995 |
| CN | 1917405 A | 2/2007 |
| CN | 101686464 A | 3/2010 |
| CN | 105451248 A * | 3/2016 |
| CN | 105451248 A | 3/2016 |
| WO | WO-2006024312 A1 * | 3/2006 ........... H04L 25/022 |

OTHER PUBLICATIONS

International Search Report and Written Opinion in International Application No. PCT/CN2019/130358, dated Sep. 17, 2020 (8 pages).

* cited by examiner

*Primary Examiner* — Vinncelas Louis
(74) *Attorney, Agent, or Firm* — Botos Churchill. IP Law LLP

(57) ABSTRACT

A system and method for identifying a viable channel within an allocated downstream spectrum and establishing communication via a modem thereon. The disclosed technology provides for the broadband analysis of some or all of the available downstream spectrum to obtain a mapping of available channels and directing the modem to establish downstream communication upon at least one of these channels. The system includes an interface via which a user can specify parameters governing the analysis of the available downstream spectrum and the identification of a viable downstream channel.

20 Claims, 3 Drawing Sheets

DOWNSTREAM MODEM CHANNEL ANALYSIS AND ALLOCATION SYSTEM AND METHOD

CROSS-REFERENCE TO RELATED APPLICATIONS

This application is a continuation application of International Application No. PCT/CN2019/130358, filed Dec. 31, 2019, and entitled "DOWNSTREAM MODEM CHANNEL ANALYSIS AND ALLOCATION SYSTEM AND METHOD", which is hereby incorporated by reference in its entirety.

BACKGROUND OF THE INVENTION

The ever-increasing utilization of broadband data communication technology and the advent of the Internet-of-Things has led to the almost ubiquitous use of cable and optical modems to provide end user connectivity in both business and residential environments. These modems, which enable two-way data transmissions between service providers and end users, provide the critical link and data management between the bidirectional cable/fiber connection with a service provider and the user's bidirectional data interface. The bidirectional broadband cable/fiber connection typically provides for a channel capable of supporting transmissions of 5 Mbps from the service provider to the user's system ("downstream channel"), and a channel capable of supporting approximately 1 Gbps for transmissions from user to the service provider's cable modem termination system ("upstream channel").

The process for establishing communication between a cable/optical modem and a service provider's CMTS requires the modem to locate and identify a primary downstream channel within the available downstream spectrum. This downstream spectrum can vary dependent upon the particular system and standard the service provider adheres to. However, regardless of the particular spectrum, present modem technology locates a usable primary channel by blindly stepping through the downstream spectrum at discrete frequency intervals (starting at either the highest or lowest frequency of the spectrum) and sensing if a particular channel is in use. The stepping interval is typically between 1 and 6 MHz and can be chosen based upon the channel bandwidth prescribed by the particular system/standard utilized by the CMTS (for example Incremental Related Carrier, Harmonic Related Carrier, etc.). Regardless of the frequency interval, the process of methodically stepping through the available downstream bandwidth is time consuming, requiring up to 40 seconds to establish a downstream connection. Such a delay is longer than many users require and/or expect.

Present modem technology is ill-suited to provide a consistently fast and reliable means of locating a viable downstream channel and establishing a connection thereon.

BRIEF SUMMARY OF THE INVENTION

A system and method for identifying a viable channel within an allocated downstream spectrum and establishing communication via a modem thereon. The disclosed technology provides for the broadband analysis of some or all of the available downstream spectrum to obtain a mapping of available channels and directing the modem to establish downstream communication upon at least one of these channels. The system includes an interface via which a user can specify parameters governing the analysis of the available downstream spectrum and the identification of a viable downstream channel.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
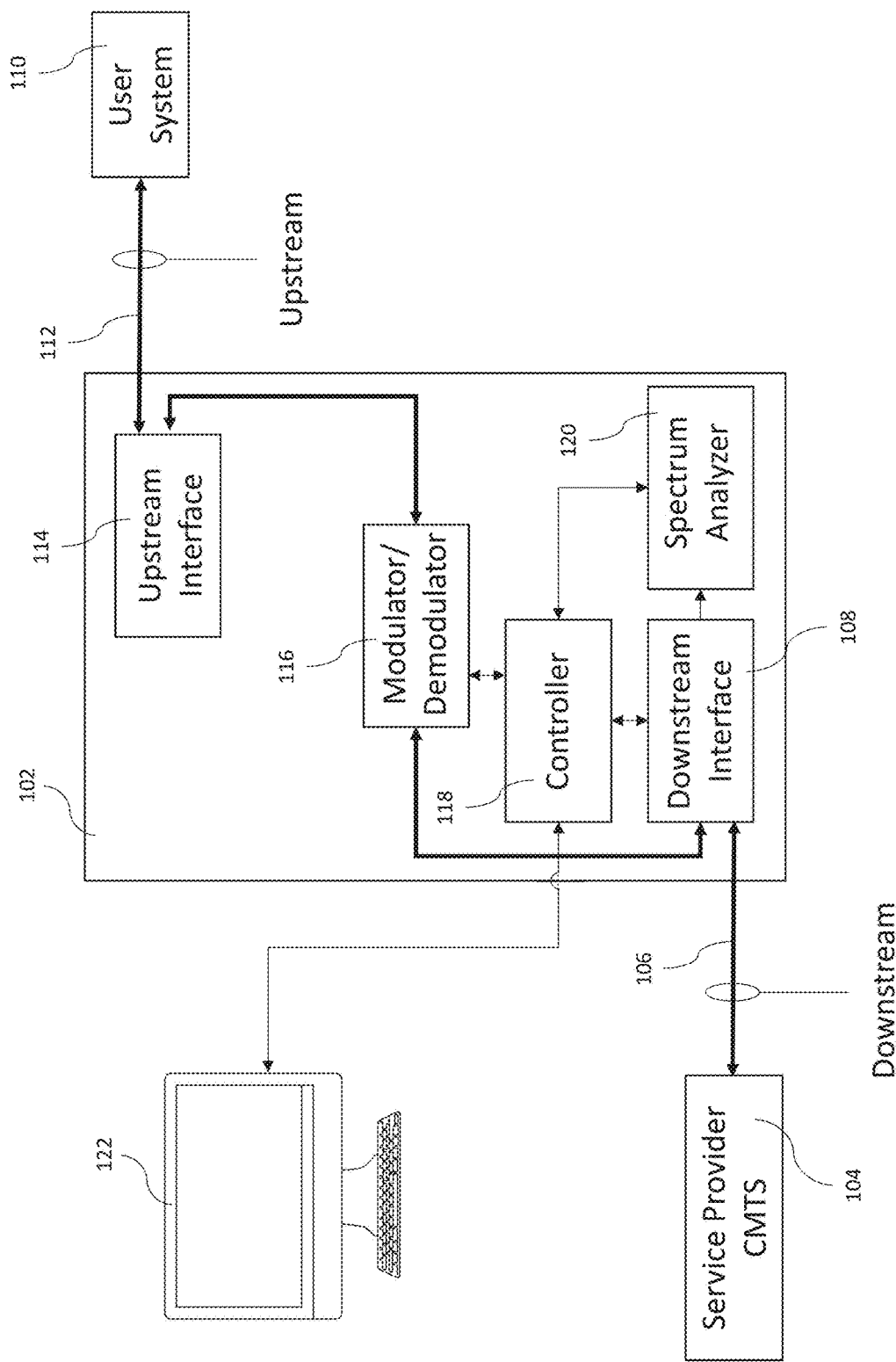
FIG. 1 is a functional block diagram of a preferred embodiment of a downstream modem channel analysis and allocation system.

FIG. 1 is a functional block diagram of a downstream channel analysis and allocation system including modem 102. As shown, modem 102 receives bidirectional communications from service provider CMTS 104, via downstream connection 106 (typically a cable or an optical fiber) and downstream interface 108. Modem 102 is also bidirectionally linked to user system 110 via upstream connection 112 and upstream interface 114. Modulator/demodulator 116 links upstream interface 114 and the downstream interface 108, providing, under the control of controller 118, the requisite metering, modulation and demodulation so as to enable bidirectional communication between the streams (106, 112). Controller 118 comprises a programmable digital microcontroller, as well as associated software, memory and interface circuitry typically required for operation and support. Such microcontroller-based systems are well-known in the art and will not be discussed in detail.

Controller 118 is also linked to receive data from and provide control signals to 118 instructs spectrum analyzer 120 to spectrum analyzer 120. Spectrum analyzer 120 is coupled to downstream interface 108 so as to permit the analysis of signals across the band of the spectrum (optical or radio frequency) encompassing the broadband signal evident on downstream interface 106, hereinafter referred to as the downstream bandwidth ("$BW_{DS}$"). Spectrum analyzer 120 is also adapted to resolve frequency distributions within $BW_{DS}$ that are equal to or less than the prescribed downstream channel bandwidth ("$BW_{CHAN}$") of the downstream signal. For example, a downstream signal modulated in accordance with the Harmonic Related Carrier standard would have a $BW_{CHAN}$ of 6 MHz. Frequency analyzers with such capabilities are well-known in the art.

Figure 2:
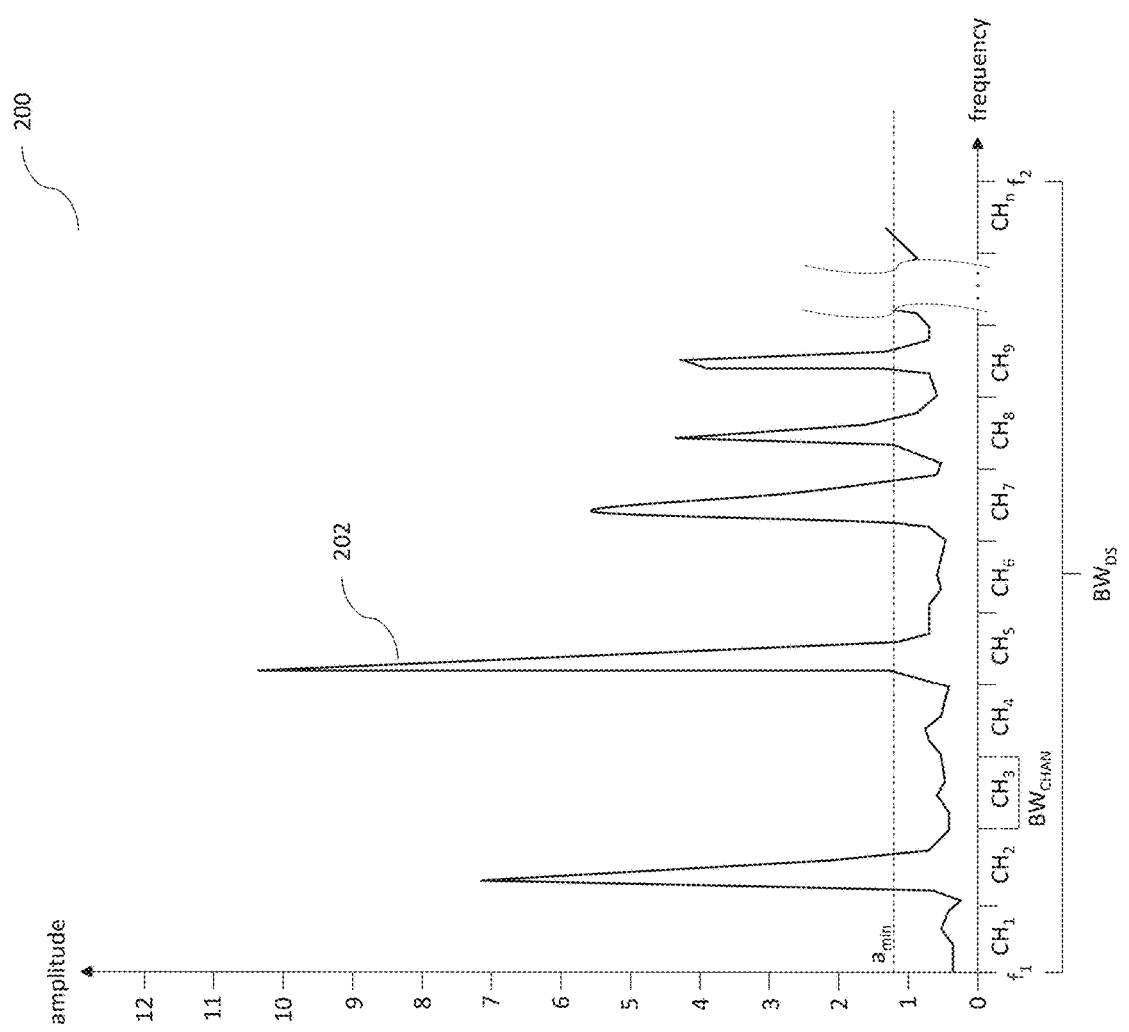
FIG. 2 is an image representing the spectrum analysis of a broadband downstream signal.
Figure 3:
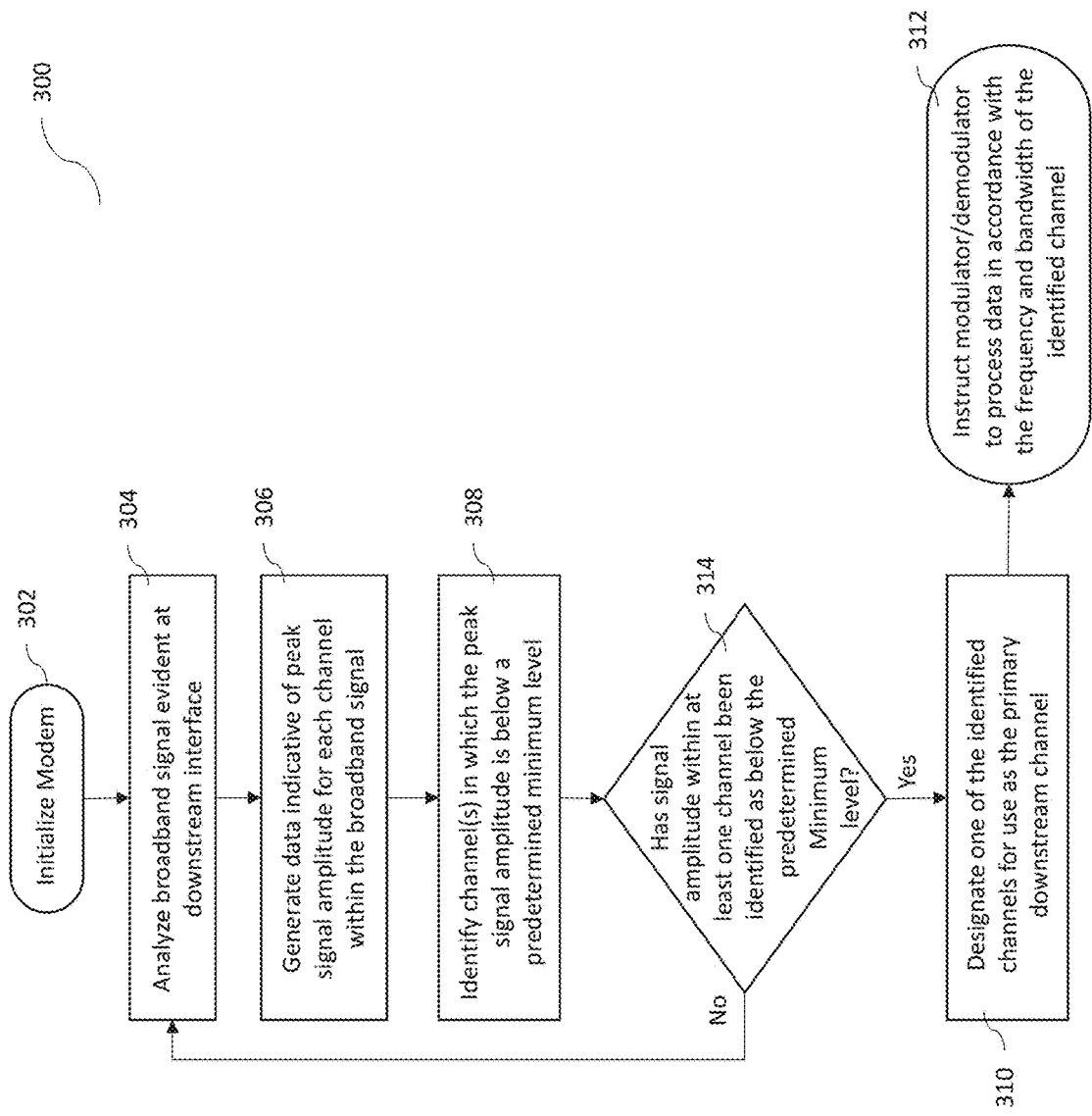
FIG. 3 is a flow diagram of operational steps executed within the system of FIG. 1.

As shown in FIG. 3, upon initialization of modem 101 (step 302), controller 118 commands spectrum analyzer 120 to perform an analysis of the broadband signal evident at downstream interface 108 (step 304). FIG. 2 provides a spectrum analysis 200 for a broadband signal spanning a bandwidth of $BW_{DS}$ (over a frequency range from $f_1$ to $f_2$). The bandwidth of channels within this broadband signal are shown to have a bandwidth of $BW_{CHAN}$, and are designated $CH_1$ through $CH_n$. As shown, spectrum analyzer 120 detects the amplitude of broadband signal 202 across bandwidth $BW_{DS}$. Data indicative of the peak signal amplitude sensed within each of the channels ($CH_1$ through $CH_n$) is then provided to controller 118 by spectrum analyzer 120 (step 306). The signal amplitude values for the spectrum analysis of broadband signal 202 are provided in Table 1:

TABLE 1

| Channel   | 1   | 2   | 3   | 4   | 5    | 6   | 7   | 8   | 9   |
|-----------|-----|-----|-----|-----|------|-----|-----|-----|-----|
| Amplitude | 0.5 | 7.3 | 0.6 | 0.7 | 10.6 | 0.6 | 5.5 | 4.4 | 4.3 |

Controller 118 is programmed to analyze the data received so as to determine if the amplitude values for each of the channels are below a predetermined level, $a_{min}$; shown in FIG. 2 to be approximately equal to an amplitude of 1.25. Any in-channel signal exhibiting an amplitude below $a_{min}$ is designated by controller 118 as available for the establishment of a primary downstream channel by modem 102.

As shown in FIG. 2, channels CH1, CH3, CH4 and CH6 would be determined by controller 118 to be available for use a primary downstream channel by modem 102 (step 308). Controller 118 would then designate one of these available channels (step 310). The designation of the channel by controller 118 could be based on an arbitrary pre-programmed algorithm. For example, controller 118 could be programmed to choose the available channel with the highest center frequency ($CH_6$), or choose the channel having the lowest noise (non-signal) amplitude ($CH_1$). Upon designating a channel for use as the primary downstream channel, controller 118 instructs modulator/demodulator 116 to process the data signals sent to and/or received from downstream interface 108 in accordance with the frequency and bandwidth of that channel (step 312).

In the event that no usable channel is detected as a consequence of the spectrum analysis, controller 118 could instruct the system to a) repeat the spectrum analysis either immediately or after a predetermined delay period (step 314), or b) step through the downstream spectrum at discrete frequency intervals (starting at either the highest or lowest frequency of the spectrum), sensing if a particular channel is in use. If no usable channel is located, the modem will then step through the downstream spectrum at discrete frequency intervals (starting at either the highest or lowest frequency of the spectrum) and sensing if a particular channel is in use.

An alternate embodiment of the invention permits a user to define parameters governing the spectrum analysis and the designation of a channel for use as a primary downstream channel. As shown in FIG. 1, user interface 122 is communicatively connected to controller 118. Employing this interface, a user can designate the minimum signal level, $a_{min}$, utilized in determining if a given channel is available. The user could also be offered the option, via interface 122, to choose the action that the system will take if an available channel cannot be identified. Interface 122 may be a device that is physically connected to the controller, or a networked device communicating with the controller via the Internet or a wireless or cellular network (i.e., a mobile device).

The disclosed invention offers many advantages, including the ability to permit an initializing modem to quickly identify a channel to be utilized as primary downstream channel. Although the invention herein has been described with reference to particular embodiments, it is to be understood that these embodiments are merely illustrative of the principles and applications of the present invention. For example, the spectrum analyzer could be configured to analyze only a portion of the total spectrum of the downstream signal at any given time, taking multiple iterations to analyze the entirety of the downstream bandwidth. Such an approach may be needed to enable a spectrum analyzer of limited bandwidth capabilities, or in environments requiring the analysis of very tightly-packed and/or narrow bandwidth channels. The spectrum analyzer could be an analog or digital analyzer. In addition, various functional aspects of the invention could be implemented via physical arrangements that might have varying degrees of integration. The entirety of the disclosed invention could be implemented within a monolithic circuit, or disparate discrete components without departing from the spirit and scope of the present invention as defined by the appended claims.

The invention claimed is:

1. A modem channel allocation system comprising:
    a downstream interface adapted to transmit and receive a broadband data signal comprising a plurality of data channels;
    a spectrum analyzer operatively coupled to the downstream interface and adapted to analyze an amplitude of at least one data signal carried within at least one of the plurality of data channels;
    a controller operatively coupled to the spectrum analyzer and a modulator/demodulator;
    the controller adapted to:
    identify, based on data received from the spectrum analyzer, the at least one data channel with a signal having the amplitude less than a predetermined signal amplitude value;
    designate, if the at least one data channel is identified as having the signal with the amplitude less than the predetermined signal amplitude value, the at least one of the identified data channels as a primary channel; and
    instruct the modulator/demodulator to utilize the designated at least one of the identified data channels as a primary channel.

2. The system of claim 1 wherein the broadband data signal is a modulated radio frequency signal.

3. The system of claim 1 wherein the broadband data signal is a modulated optical signal.

4. The system of claim 1 wherein the designation of at least one of said plurality of data channels as a primary channel based is based, at least in part, on the level of noise evident within the channel.

5. The system of claim 1 wherein the designation of at least one of said plurality of data channels as a primary channel based is based, at least in part, on the center frequency of the channel.

6. The system of claim 1 further comprising an interface adapted to enable a user to specify the predetermined signal amplitude value.

7. The system of claim 6 wherein the user interface comprises at least one of:
    a personal computer; and
    a mobile device.

8. The system, of claim 1 wherein if the at least one data channel cannot be identified as having the signal with the amplitude less than the predetermined signal amplitude, the controller is further adapted to: receive an updated analysis from the spectrum analyzer of the amplitude of the at least one data signal carried within at least one of the plurality of data channels; identify, based on the updated analysis, the at least one data channel with the signal having the amplitude less than the predetermined signal amplitude value; designate, if the at least one data channel is identified as having the signal with the amplitude less than the predetermined signal amplitude value, the at least one of the identified data channels as a primary channel; and instruct the modulator/ demodulator to utilize the designated at least one of the identified data channels as a primary channel.

9. The system of claim 8 wherein the controller receives the updated analysis from the spectrum analyzer after a predetermined delay period.

10. The system of claim 9 further comprising an interface adapted to enable a user to specify the predetermined delay period.

11. A method of modem channel allocation comprising:
analyzing an amplitude of at least one data signal carried within at least one of a plurality of data channels within a broadband data signal;
identifying, based on the analysis of the amplitude of the at least one data signal, the at least one data channel with a signal having the amplitude less than a predetermined signal amplitude value;
designating, if the at least one data channel is identified as having the signal with the amplitude less than the predetermined signal amplitude value, the at least one of the identified data channels as a primary channel; and
instructing a modulator/demodulator to utilize the designated at least one of the identified data channels as a primary channel.

12. The method of claim 11 wherein the broadband data signal is a modulated radio frequency signal.

13. The method of claim 11 wherein the broadband data signal is a modulated optical signal.

14. The method of claim 11 wherein the designation of at least one of said plurality of data channels as a primary channel based is based, at least in part, on the level of noise evident within the channel.

15. The method of claim 11 wherein the designation of at least one of said plurality of data channels as a primary channel based is based, at least in part, on the center frequency of the channel.

16. The method of claim 11 the predetermined signal amplitude value is specified by a user.

17. The method, of claim 11 further comprising, if the at least one data channel cannot be identified as having the signal with the amplitude less than the predetermined signal amplitude, the steps: receiving an updated analysis from the spectrum analyzer of the amplitude of the at least one data signal carried within the at least one of the plurality of data channels; identifying, based on the received updated analysis, the at least one data channel with the signal having the amplitude less than the predetermined signal amplitude value; designating, if the at least one data channel is identified as having the signal with the amplitude less than the predetermined signal amplitude value, the at least one of the identified data channels as a primary channel; and instructing the modulator/demodulator to utilize the designated at least one of the identified data channels as a primary channel.

18. The method of claim 17 wherein the controller receives the updated analysis from the spectrum analyzer after a predetermined delay period.

19. The method of claim 18 wherein the delay period is specified by a user.

20. The method of claim 19 wherein the user specifies the delay via an interface comprising at least one of:
a personal computer; and
a mobile device.

* * * * *